(12) United States Patent
Kato et al.

(10) Patent No.: US 8,046,152 B2
(45) Date of Patent: Oct. 25, 2011

(54) DEVICE FOR CONTROLLING INTERNAL COMBUSTION ENGINES

(75) Inventors: Yuuichi Kato, Susono (JP); Hiroki Ichinose, Fujinomiya (JP); Nao Murase, Susono (JP); Rie Osaki, Anjyo (JP)

(73) Assignees: Toyota Jidosha Kabushiki Kaisha, Aichi (JP); Nippon Soken, Inc, Aichi (JP)

( * ) Notice: Subject to any disclaimer, the term of this patent is extended or adjusted under 35 U.S.C. 154(b) by 321 days.

(21) Appl. No.: 12/519,025

(22) PCT Filed: Jan. 21, 2008

(86) PCT No.: PCT/JP2008/051141
§ 371 (c)(1),
(2), (4) Date: Jun. 12, 2009

(87) PCT Pub. No.: WO2008/090998
PCT Pub. Date: Jul. 31, 2008

(65) Prior Publication Data
US 2010/0036587 A1    Feb. 11, 2010

(30) Foreign Application Priority Data
Jan. 23, 2007    (JP) ................. 2007-012642

(51) Int. Cl.
*F02D 43/00*    (2006.01)
*F02P 5/00*    (2006.01)

(52) U.S. Cl. ............ 701/103; 123/1 A; 123/406.3; 123/575

(58) Field of Classification Search ......... 701/101–104, 701/109, 112, 114–115; 123/1 A, 27 GE, 123/299, 304, 406.3, 406.31, 494, 525–527, 123/575, 578; 73/35.01, 35.02, 35.07, 61.43, 73/61.44, 114.38, 114.52–114.54, 114.72, 73/114.73; 702/182, 183, 185
See application file for complete search history.

(56) References Cited

U.S. PATENT DOCUMENTS

| 5,301,648 | A | | 4/1994 | Uchinami |
| 5,381,767 | A | | 1/1995 | Kikuchi |
| 5,586,537 | A | * | 12/1996 | Tomisawa et al. ............ 123/435 |
| 6,314,944 | B1 | | 11/2001 | Majima |
| 7,027,906 | B2 | * | 4/2006 | Araki ............................ 701/104 |
| 7,373,929 | B2 | * | 5/2008 | Amano et al. ................ 123/491 |
| 2003/0070666 | A1 | | 4/2003 | Hosoi |
| 2004/0261414 | A1 | * | 12/2004 | Araki ............................. 60/602 |
| 2007/0289366 | A1 | * | 12/2007 | Amano et al. .............. 73/64.46 |
| 2010/0049422 | A1 | * | 2/2010 | Moriya ....................... 701/103 |

FOREIGN PATENT DOCUMENTS

JP    05-156983 A    6/1993

(Continued)

*Primary Examiner* — John Kwon
*Assistant Examiner* — Johnny Hoang
(74) *Attorney, Agent, or Firm* — Sughrue Mion, PLLC

(57) ABSTRACT

A device for controlling an internal combustion engine which uses, as the fuel, a heavy fuel, a light fuel, an alcohol fuel and a mixture thereof, comprising a heavy fuel/light fuel ratio detector 39 capable of detecting the ratio of the heavy fuel and the light fuel, and an air-fuel ratio detector 41 for detecting the air-fuel ratio of the exhaust gas, wherein the amount of fuel injection is calculated based on the heavy fuel/light fuel ratio detector so that the air-fuel ratio becomes a target air-fuel ratio. The heavy fuel/light fuel ratio detector is diagnosed if it is in an abnormal condition based on a difference between the target air-fuel ratio and the air-fuel ratio detected by the air-fuel ratio detector while the engine temperature is in a particular temperature region. The heavy fuel/light fuel ratio detector can be correctly diagnosed if it is in an abnormal condition even when an alcohol-mixed fuel is used.

8 Claims, 6 Drawing Sheets

FOREIGN PATENT DOCUMENTS

| | | |
|---|---|---|
| JP | 6-614 A | 1/1994 |
| JP | 06-017693 A | 1/1994 |
| JP | 6-6217 A | 2/1994 |
| JP | 10-019775 A | 1/1998 |
| JP | 11-241644 A | 9/1999 |
| JP | 2001-107796 A | 4/2001 |
| JP | 2002-188503 A | 7/2002 |
| JP | 2003-120363 A | 4/2003 |

* cited by examiner

Fig.1
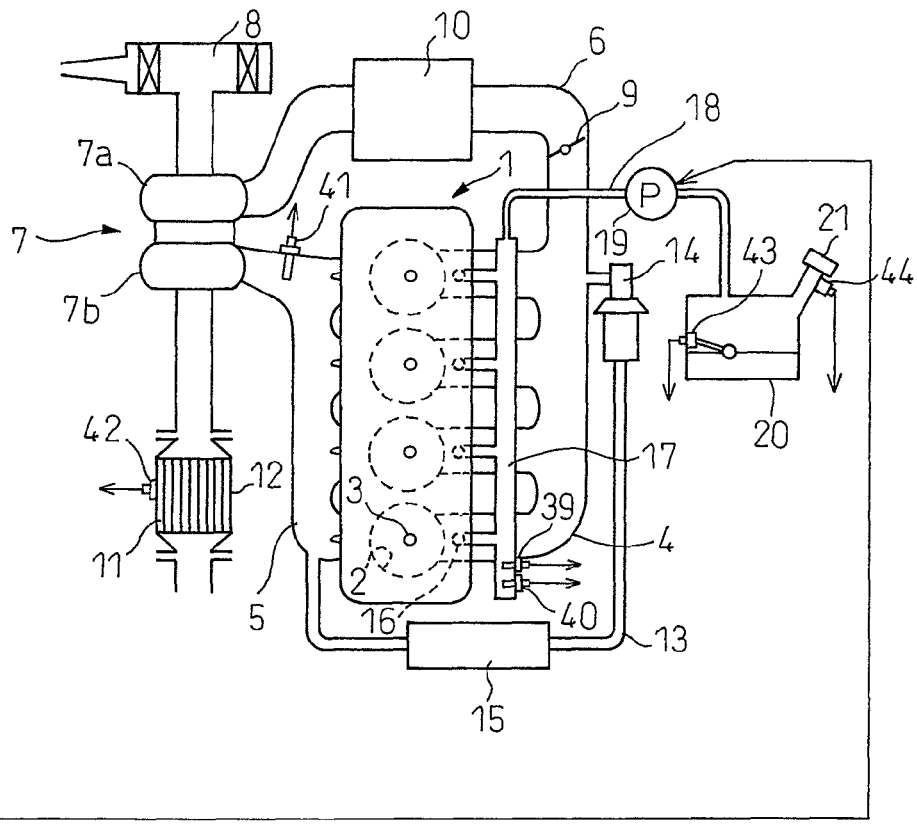
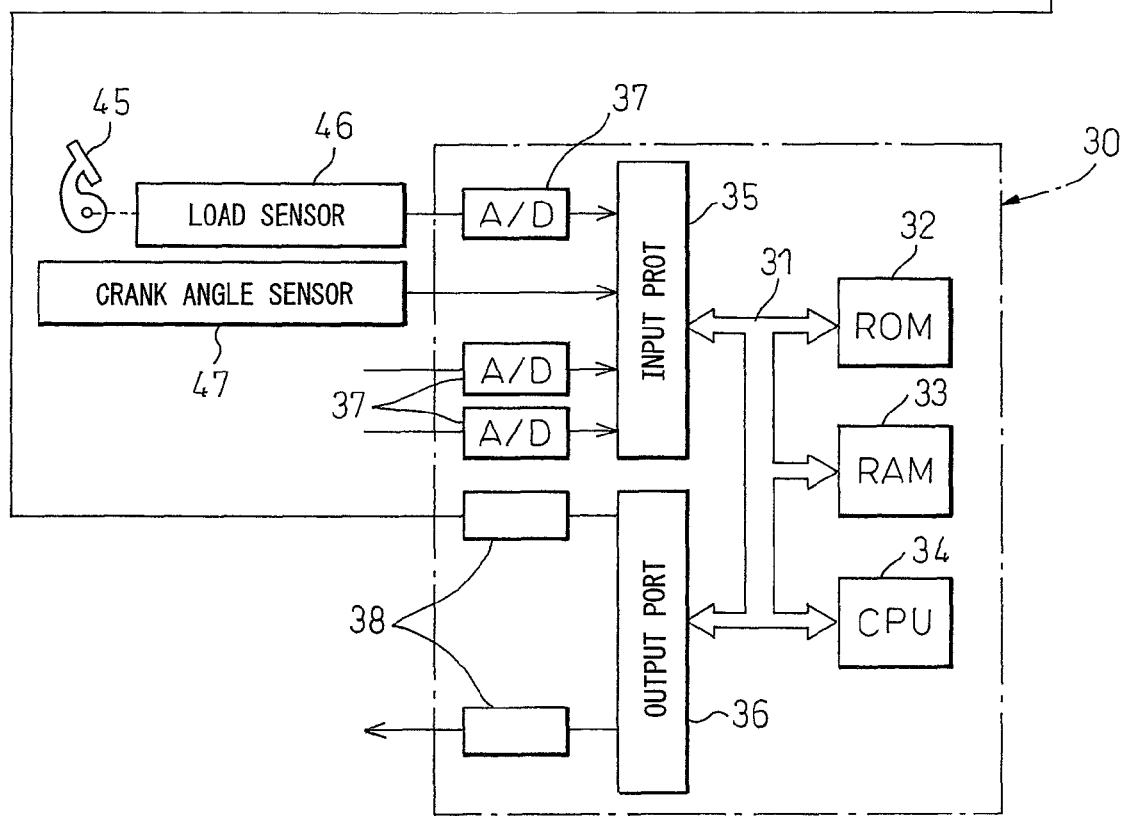

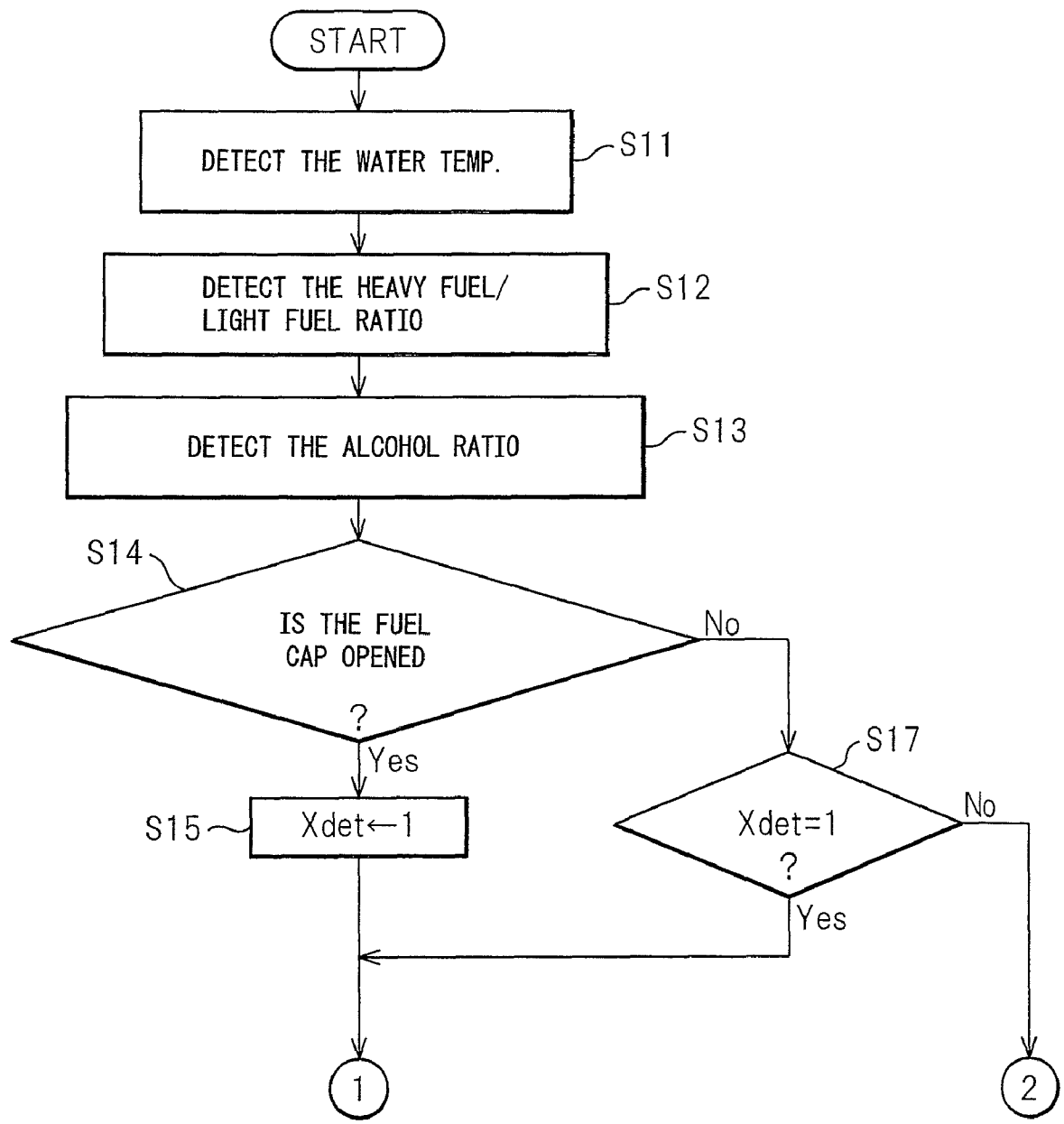

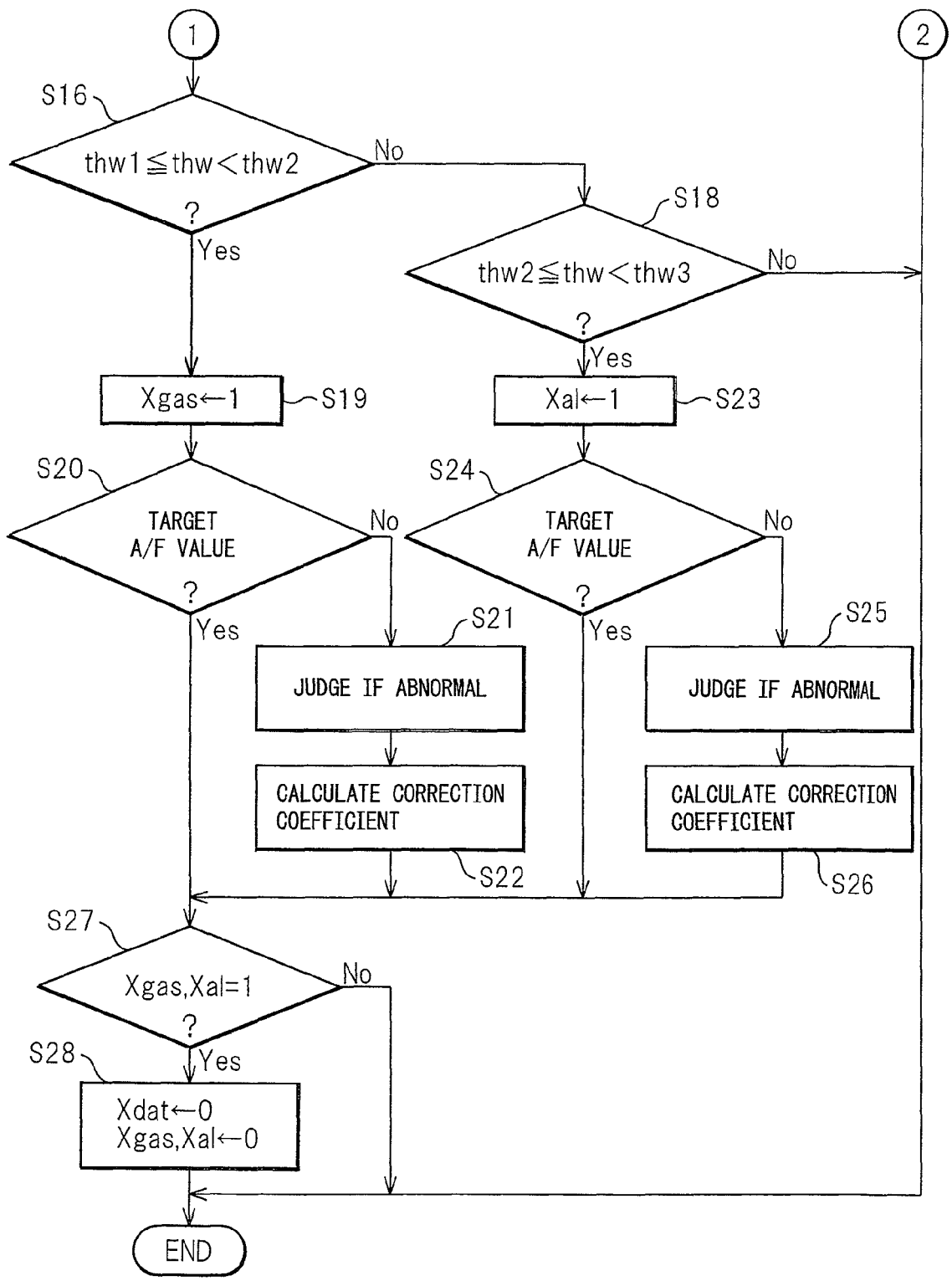

DEVICE FOR CONTROLLING INTERNAL COMBUSTION ENGINES

BACKGROUND OF THE INVENTION

1. Field of the Invention

This invention relates to a device for controlling internal combustion engines.

2. Description of the Related Art

In recent years, alcohol (in particular, ethyl alcohol) is drawing attention as an alternative fuel to the gasoline, from the standpoint of reducing public hazard and suppressing the use of natural resources. In many cases, alcohol is not used alone but is used as an alcohol-mixed fuel made by mixing alcohol into gasoline or the like. The alcohol ratio in the alcohol-mixed fuel is not always constant. In order to properly control an internal combustion engine, the engine control parameter for controlling the internal combustion, such as the amount of fuel injection, must be changed depending upon the alcohol ratio. Therefore, it is necessary to detect the alcohol ratio in the case that the property of the fuel has changed due to refueling.

According to Japanese Unexamined Patent Publication JP-A-2003-120363, if refueling is detected, the amount of fuel injection is temporarily increased or decreased, and then the alcohol ratio is estimated based on the behavior of the air-fuel ratio of the exhaust gas. If the alcohol ratio increases, in particular the amount of deviation in the air-fuel ratio decreases between when the amount of fuel injection is increased and when the amount of fuel injection is decreased. Therefore, in the disclosed device, a difference is detected between the air-fuel ratio of when the amount of fuel injection is increased and the air-fuel ratio of when the amount of fuel injection is decreased, and the alcohol ratio is estimated based on the difference.

Gasoline that is widely used as fuel for internal combustion engines can be grouped into a light fuel containing highly volatile light components in a large amount and a heavy fuel containing lowly volatile heavy components in a large amount. In order for the an internal combustion engine to properly operate when starting, the engine must be controlled depending upon the ratio of the light fuel and the heavy fuel. Therefore, it is necessary to detect the ratio of the light fuel and the heavy fuel in the fuel. So far, the ratio has been detected by using a heavy fuel/light fuel ratio detector that detects the ratio of the light fuel and the heavy fuel in the fuel.

When the heavy fuel/light fuel ratio detector is used, there is no guarantee that the detector will always operate properly. Therefore, a device for diagnosing the abnormal condition of the detector is necessary. At the start of the engine, the air-fuel ratio of the exhaust gas varies depending upon the ratio of the light fuel and the heavy fuel due to a difference in the volatility of the light fuel and the heavy fuel. Therefore, the above ratio can be estimated based on the air-fuel ratio of the exhaust gas, and the detector can be diagnosed if it is in abnormal condition, by comparing the estimated ratio with the ratio detected by the heavy fuel/light fuel ratio detector.

In addition to the heavy fuel and the light fuel, however, the alcohol-mixed fuel contains alcohol as the fuel. The stoichiometric air-fuel ratio of the alcohol is lower than the stoichiometric air-fuel ratio of the gasoline. Therefore, the air-fuel ratio of the exhaust gas varies depending not only upon the ratio of the light fuel and the heavy fuel in the fuel but also upon the alcohol ratio in the fuel. When the alcohol-mixed fuel is used, therefore, the above-mentioned method is not capable of correctly diagnosing if the heavy fuel/light fuel ratio detector is in abnormal condition.

SUMMARY OF THE INVENTION

It is, therefore, an object of the present invention to provide a device for controlling internal combustion engines, which is capable of correctly diagnosing a heavy fuel/light fuel ratio detector if it is in abnormal condition even when an alcohol-mixed fuel is used.

As means for solving the above problems, the present invention provides a device for controlling an internal combustion engine as described in claims.

According to a first aspect of the invention, there is provided a device for controlling an internal combustion engine which uses, as the fuel, a heavy fuel, a light fuel, an alcohol fuel and a mixture thereof, comprising a heavy fuel/light fuel ratio detector capable of detecting the ratio of the heavy fuel and the light fuel, and an air-fuel ratio detector for detecting the air-fuel ratio of the exhaust gas, wherein the amount of fuel injection is calculated based on the heavy fuel/light fuel ratio detector so that the air-fuel ratio becomes a target air-fuel ratio, and wherein the heavy fuel/light fuel ratio detector is diagnosed if it is in abnormal condition based on a difference between the target air-fuel ratio and the air-fuel ratio detected by the air-fuel ratio detector while the engine temperature is in a particular temperature region.

The particular temperature region is a temperature region in which the amount of fuel injection necessary for bringing the ideal air-fuel ratio to the target air-fuel ratio merely vary irrespective of if alcohol is contained in the fuel despite of a difference in the evaporation rates among the heavy fuel, light fuel and alcohol fuel.

According to this embodiment, abnormal condition is diagnosed based on a difference in the air-fuel ratio in the particular temperature region and, therefore, the heavy fuel/light fuel ratio detector can be correctly detected if it is in abnormal condition irrespective of if alcohol is contained. Therefore, the heavy fuel/light fuel ratio detector can be correctly diagnosed if it is in abnormal condition even when alcohol-mixed fuel is used.

According to a second aspect of the invention, there is provided the device further comprising an alcohol ratio detector capable of detecting the alcohol ratio in the fuel, wherein the control device calculate the amount of fuel injection based on the heavy fuel/light fuel ratio detector as well as on the alcohol ratio detector, so that the air-fuel ratio becomes the target air-fuel ratio, and wherein the alcohol ratio detector is diagnosed if it is in abnormal condition, based on a difference between the target air-fuel ratio and the air-fuel ratio detected by the air-fuel ratio detector while the engine temperature is outside the particular temperature region.

According to a third aspect of the invention, there is provided a device wherein when the air-fuel ratio detected by the air-fuel ratio detector is leaner than the target air-fuel ratio while the engine temperature is in the particular temperature region, the ideal ratio of the heavy fuel to the light fuel is judged to be higher than the ratio of the heavy fuel to the light fuel detected by the heavy fuel/light fuel ratio detector and when the air-fuel ratio detected by the air-fuel ratio detector is richer than the target air-fuel ratio while the engine temperature is in the particular temperature region, the ideal ratio of the light fuel to the heavy fuel is judged to be higher than the ratio of the light fuel to the heavy fuel detected by the heavy fuel/light fuel ratio detector.

According to a fourth aspect of the invention, there is provided a device wherein the calculated amount of fuel injection is corrected based upon a difference between the target air-fuel ratio and the air-fuel ratio detected by the air-fuel ratio detector while the engine temperature is in the particular temperature region, and upon a difference between the target air-fuel ratio and the air-fuel ratio detected by the air-fuel ratio detector while the engine temperature is outside the particular temperature region.

According to a fifth aspect of the invention, there is provided a device further comprising a refuel judging device for determining if the fuel is supplied, and it is judged if the heavy fuel/light fuel ratio detector is in abnormal condition only when the refuel judging device has judged that the fuel is supplied.

According to a sixth aspect of the invention, there is provided a device for controlling an internal combustion engine which uses, as the fuel, a heavy fuel, a light fuel, an alcohol fuel and a mixture thereof, comprising a heavy fuel/light fuel ratio detector capable of detecting the ratio of the heavy fuel and the light fuel, wherein the ignition timing is controlled so that the engine rotational speed reaches a target rotational speed, and wherein an estimated ignition timing at which the ignition timing is estimated to arrive is calculated based on the heavy fuel/light fuel ratio detector, and the heavy fuel/light fuel ratio detector is diagnosed if it is in abnormal condition, based on a difference between the estimated ignition timing and the ideal ignition timing while the engine temperature is in a particular temperature region.

According to a seventh aspect of the invention, there is provided a device further comprising an alcohol ratio detector capable of detecting the alcohol ratio in the fuel, wherein the control device calculate the estimated ignition timing at which the ignition timing is estimated to arrive based on the heavy fuel/light fuel ratio detector as well as on the alcohol ratio detector, and wherein the alcohol ratio detector is diagnosed if it is in abnormal condition, based on a difference between the estimated ignition timing and the ideal ignition timing while the engine temperature is outside the particular temperature region.

According to an eighth aspect of the invention, there is provided a device wherein when the ideal ignition timing is on the advanced side of the estimated ignition timing while the engine temperature is in the particular temperature region, the ideal ratio of the heavy fuel to the light fuel is judged to be higher than the ratio of the heavy fuel to the light fuel detected by the heavy fuel/light fuel ratio detector and when the ideal ignition timing is on the retarded side of the estimated ignition timing while the engine temperature is in the particular temperature region, the ideal ratio of the light fuel to the heavy fuel is judged to be higher than the ratio of the light fuel to the heavy fuel detected by the heavy fuel/light fuel ratio detector.

The invention will be more fully understood from the following description of preferred embodiments of the invention in conjunction with the accompanying drawings.

BRIEF DESCRIPTION OF THE DRAWINGS

FIG. 1 is a view schematically illustrating an internal combustion engine on which a control device of the invention can be mounted;

FIG. 5 illustrates part of a flowchart of a control routine for diagnosing a heavy fuel/light fuel ratio detector and an alcohol ratio detector if they are in abnormal condition;

FIG. 6 illustrates another part of the flowchart of the control routine for diagnosing the heavy fuel/light fuel ratio detector and the alcohol ratio detector if they are in abnormal condition.

DESCRIPTION OF THE PREFERRED EMBODIMENTS

Figure 2:
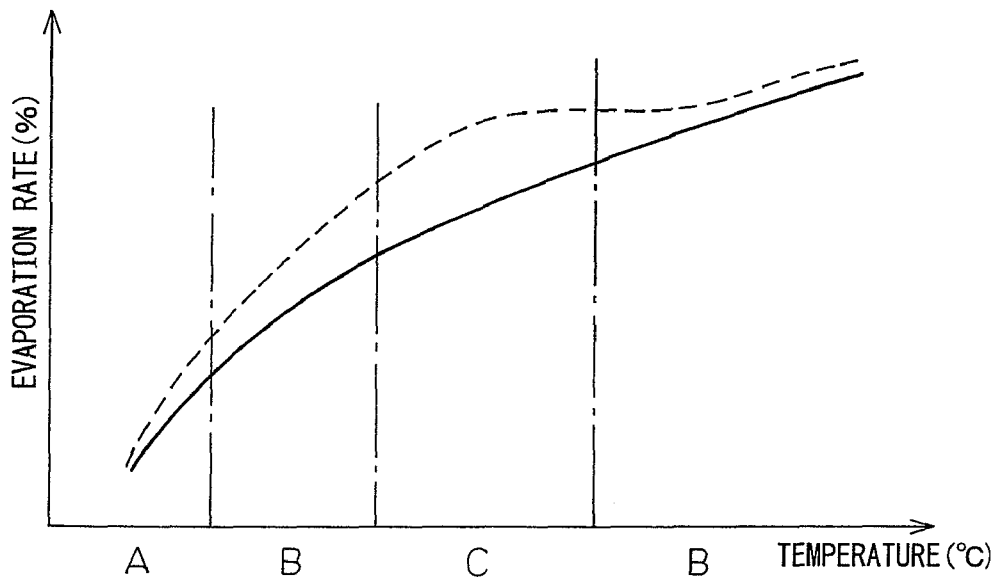
FIG. 2 is a diagram illustrating relationships between the temperature of the cooling water and the evaporation rate regarding a fuel without alcohol and an alcohol-mixed fuel.

An embodiment of the present invention will now be described in detail with reference to the drawings.

FIG. 1 illustrates a case of when a control device according to a first embodiment of the present invention is applied to a direct injection spark ignition-type internal combustion engine.

Referring to FIG. 1, reference numeral 1 denotes an engine body, 2 denotes a combustion chamber of each cylinder, 3 denotes a spark plug for igniting the fuel in each combustion chamber 2, 4 denotes an intake manifold, and 5 denotes an exhaust manifold. The intake manifold 4 is coupled to the outlet of a compressor 7a of an exhaust turbo charger 7 through an intake pipe 6, and the inlet of the compressor 7a is coupled to an air cleaner 8. A throttle valve 9 driven by a step motor is arranged in the intake pipe 6, and a cooling device 10 is arranged surrounding the intake pipe 6 to cool the intake air flowing through the intake pipe 6. In the embodiment shown in FIG. 1, the engine cooling water is introduced into the cooling device 10, and the intake air is cooled by the engine cooling water. On the other hand, the exhaust manifold 5 is coupled to the inlet of an exhaust turbine 7b of the exhaust turbo charger 7, and the outlet of the exhaust turbine 7b is coupled to a casing 12 which houses an exhaust gas-purifying catalyst 11.

The exhaust manifold 5 and the intake manifold 4 are coupled together via an exhaust gas recirculation (hereinafter referred to as EGR) passage 13, and an electronically controlled EGR control valve 14 is arranged in the EGR passage 13. An EGR cooling device 15 is arranged surrounding the EGR passage 13 to cool the EGR gas that flows through the EGR passage 13. In the embodiment shown in FIG. 1, the engine cooling water is introduced into the cooling device 15, and the EGR gas is cooled by the engine cooling water.

An electronically controlled fuel injector 16 is provided in each intake port communicated with each combustion chamber 2 in order to inject the fuel into the intake port, each fuel injector 16 being coupled to a delivery pipe 17. The delivery pipe 17 is coupled to a fuel tank 20 through a fuel pipe 18 and a fuel pump 19. A fuel opening of the fuel tank 20 is provided with a fuel cap 21. The fuel pump 19 feeds the fuel from the fuel tank 20 into the delivery pipe 17, and the fuel fed into the delivery pipe 17 is, then, fed to the fuel injectors 16. In the following description, the air containing the EGR gas is simply referred to as the air.

An electronic control unit 30 comprises a ROM (read-only memory) 32, RAM (random access memory) 33, CPU (microprocessor) 34, input port 35 and output port 36 which are connected to each other through a bidirectional bus 31. Fuel property detectors 39 and 40 are attached to the delivery pipe 17 to detect properties of the fuel in the delivery pipe 17, an air-fuel ratio detector 41 is attached to the exhaust manifold 5 to detect the air-fuel ratio of the exhaust gas passing through the exhaust manifold 5, and a temperature detector 42 is attached to the exhaust gas-purifying catalyst 11 to detect the temperature of the exhaust gas-purifying catalyst 11. Output signals of the fuel property detectors 39, 40, air-fuel ratio detector 41 and temperature detector 42 are input to the input port 35 via corresponding AD converters 37. Further, a fuel gauge 43 is attached in the fuel tank 20 to detect the amount of fuel in the fuel tank 20, and an open/close detector 44 is attached to the fuel opening of the fuel tank 20 to detect if the fuel cap 21 is opened. Output signals of the fuel gauge 43 and the open/close detector 44 are input to the input port 35 via corresponding AD converters 37.

Further, a load detector 46 is connected to the accelerator pedal 45 to generate an output voltage in proportion to the depressing amount of the accelerator pedal 45, and the output voltage of the load detector 46 is input to the input port 35 via a corresponding AD converter 37. To the input port 35 is, further, connected a crank angle detector 47 that generates an output pulse for every revolution of the crankshaft by, for example, 15°. The crank angle detector 47 detects the engine rotational speed. The output port 36, on the other hand, is connected to the fuel injectors 16, step motor for driving the throttle valve 9, EGR control valve 15 and fuel pump 19 through drive circuits 38.

The internal combustion engine of the present invention uses a mixed fuel of gasoline and alcohol (hereinafter referred to as "alcohol-mixed fuel") as the fuel to be fed into the combustion chambers 2. As is well known, the gasoline can be grouped into a light fuel containing highly volatile light components in large amount and a heavy fuel containing lowly volatile heavy components in large amounts. The fuel fed into the combustion chambers 2 contains the light fuel and the heavy fuel at an arbitrary ratio, which are mixed together.

If the engine temperature (e.g., engine cooling water temperature, oil temperature, fuel temperature; hereinafter, the cooling water temperature is referred to) is not lower than a predetermined temperature, both the light fuel and the heavy fuel easily evaporate. Therefore, even when either fuel is used, performance (e.g., torque, etc.) which the internal combustion engine produces is not decreased. However, if the temperature of the engine cooling water is not higher than the predetermined temperature, the light fuel easily evaporates while the heavy fuel does not easily evaporate. Therefore, even if the amount of fuel injection is the same, the heavy fuel easily deposits on the wall surfaces of intake ports and on the wall surfaces of cylinders than the light fuel. Therefore, a decreased amount of fuel substantially contributes to the combustion in the combustion chambers 2.

When the heavy fuel is used, therefore, the amount of feeding the fuel into the combustion chambers becomes smaller than a target amount at the cold start of the internal combustion engine, and thus the air-fuel ratio tends to increase (becomes lean), though it may vary depending upon the amount of fuel that has been set. Conversely, when the light fuel is used, the amount of feeding the fuel into the combustion chambers becomes larger than the target amount at the cold start of the internal combustion engine, and thus the air-fuel ratio tends to decrease (becomes rich). Either case could be a cause of poor starting performance, poor fuel consumption, lack of torque and deteriorated exhaust emission. To prevent such an occurrence, it is necessary to detect the ratio of the heavy fuel and the light fuel in the fuel (hereinafter referred to as "heavy fuel/light fuel ratio").

In this embodiment, the fuel property detector (heavy fuel/light fuel ratio detector) 39 attached to the delivery pipe 17 detects the heavy fuel/light fuel ratio of the fuel in the delivery pipe 17, i.e., of the fuel fed into the combustion chambers 2. The heavy fuel/light fuel ratio detector 39 is a detector for estimating the heavy fuel/light fuel ratio based on the density of the fuel that is calculated by detecting the refractive index of the fuel in the delivery pipe 17.

The alcohol generates heat less, and establishes a stoichiometric air-fuel ratio smaller, than that of the gasoline. Therefore, in the case where the air fed into the combustion chamber is the same, the alcohol-mixed fuel must, usually, be fed into the combustion chambers 2 in an amount larger than the amount of the gasoline, depending upon the ratio of alcohol contained in the fuel (hereinafter referred to as "alcohol ratio"). To determine a suitable amount of fuel that is to be fed into the combustion chambers 2, the alcohol ratio in the fuel must be detected.

In this embodiment, the fuel property detector (alcohol ratio detector) 40 attached to the delivery pipe 17 detects the alcohol ratio of the fuel in the delivery pipe 17, i.e., of the fuel fed into the combustion chambers 2. The alcohol ratio detector 40 may be an optical-type detector which utilizes a change in the refractive index due to the alcohol that is mixed, or may be an electrostatic capacity-type detector which utilizes differences in the dielectric constant and in the resistance between the alcohol and the gasoline.

In this embodiment as described above, the internal combustion engine is controlled based upon the heavy fuel/light fuel ratio detected by the heavy fuel/light fuel ratio detector 39 and upon the alcohol ratio detected by the alcohol ratio detector 40. At the start of the engine, for example, the light fuel more easily evaporates, and thus the fuel injection amount decreases as the ratio of the light fuel to the heavy fuel increases. Further, the alcohol establishes a low stoichiometric air-fuel ratio, and thus the fuel injection amount increases as the alcohol ratio increases.

In the thus constituted internal combustion engine, if the heavy fuel/light fuel ratio or the alcohol ratio cannot be correctly detected due to abnormal condition in the fuel property detectors 39 and 40, then the fuel cannot be properly injected from the fuel injectors 16, and the operating condition of the internal combustion engine loses stability. To prevent such an occurrence, it is necessary to diagnose if the fuel property detectors 39 and 40 are properly operating, i.e., it is necessary to diagnose the fuel property detectors 39 and 40 if they are in abnormal condition.

The fuel property detectors 39 and 40 can be diagnosed if they are in abnormal condition by, for example, utilizing the air-fuel ratio of the exhaust gas detected by the air-fuel ratio detector 41. The diagnoses of the heavy fuel/light fuel ratio detector 39 will now be described as an example. In the case where the heavy fuel/light fuel ratio detector 39 is in abnormal condition and detects the ratio of the heavy fuel to be higher than the ideal ratio of the heavy fuel, the air-fuel ratio of the exhaust gas becomes richer than the target air-fuel ratio at the start of the engine if the internal combustion engine is controlled based on the ratio of the heavy fuel detected by the heavy fuel/light fuel ratio detector 39. Conversely, in the case where the heavy fuel/light fuel ratio detector 39 detects the ratio of the heavy fuel to be lower than the ideal ratio of the heavy fuel, the air-fuel ratio of the exhaust gas becomes leaner than the target air-fuel ratio at the start of the engine if the internal combustion engine is controlled based on the ratio of the heavy fuel detected by the heavy fuel/light fuel ratio detector 39. Therefore, the detected ratio of the heavy fuel becomes higher than the ideal ratio if the air-fuel ratio of the exhaust gas detected by the air-fuel ratio detector 41 is richer than the target air-fuel ratio, and the detected ratio of the heavy fuel becomes lower than the ideal ratio if the air-fuel ratio of the exhaust gas detected by the air-fuel ratio detector 41 is leaner than the target air-fuel ratio. In either of these cases, the ratio of the heavy fuel has not been correctly detected by the heavy fuel/light fuel ratio detector 39, and the detector 39 can be diagnosed as in abnormal condition.

However, the alcohol-mixed fuel contains alcohol in addition to the heavy fuel and the light fuel, and if the alcohol ratio detector 40 is in abnormal condition and detects the alcohol ratio different from the ideal alcohol ratio, then the air-fuel ratio detected by the air-fuel ratio detector 41 is also different from the target air-fuel ratio. Therefore, even if the air-fuel ratio of the exhaust gas detected by the air-fuel ratio detector 41 is different from the ideal air-fuel ratio, it cannot be decided if the heavy fuel/light fuel ratio detector 39 is in abnormal condition or the alcohol ratio detector 40 is in abnormal condition.

The fuel evaporation characteristics of the alcohol-mixed fuel varies near the boiling point of the alcohol (78.3° C. in the case of ethanol). FIG. 2 is a diagram illustrating relationships between the temperature of the cooling water and the evaporation rate regarding a fuel without alcohol and an alcohol-mixed fuel, wherein a solid line represents the fuel without alcohol and a broken line represents the alcohol-mixed fuel. As shown in FIG. 2, the alcohol-mixed fuel has a higher evaporation rate than the fuel without alcohol over the whole temperature region, and has a particularly high evaporation rate in a temperature region C in FIG. 2.

Figure 3:
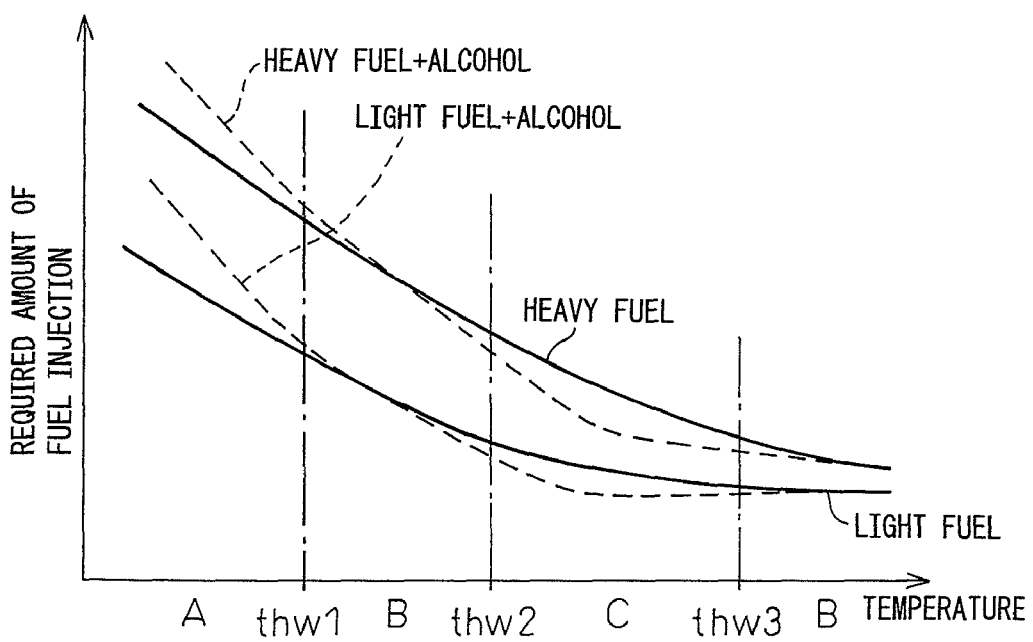
FIG. 3 is a diagram illustrating relationships between the temperature of the cooling water and the evaporation rate regarding various kinds of fuels.

As described above, the fuel evaporation rate differs between the alcohol-mixed fuel and the fuel without alcohol depending upon the temperature of the cooling water. Therefore, the fuel injection amount necessary for bringing the air-fuel ratio to the target air-fuel ratio also varies depending upon the temperature of the cooling water. FIG. 3 is a diagram illustrating the relationship between the fuel injection amount necessary for bringing the air-fuel ratio into the target air-fuel ratio and the temperature of the cooling water, regarding various kinds of fuels, wherein solid lines represent the relationship of fuels not containing alcohol, i.e., the relationship when the heavy fuel and the light fuel are used, and the broken lines represent the relationship when alcohol-mixed fuels are used, i.e., the relationship of a mixed fuel containing heavy fuel and alcohol, and a mixed fuel containing light fuel and alcohol. In this embodiment, the fuel injection amount is set depending upon the output values of the heavy fuel/light fuel ratio detector 39 and of the alcohol ratio detector 40, and upon the map shown in FIG. 3.

As will be understood from FIG. 3, in either case of the mixed fuel of heavy fuel and alcohol or the mixed fuel of light fuel and alcohol, the fuel without alcohol is injected in an amount larger than that of alcohol-mixed fuel to bring the air-fuel ratio to the target air-fuel ratio if the temperature of the cooling water is low (e.g., 0° C. or lower), i.e., if the temperature of the cooling water is in a temperature region A. This is because in the temperature region A, the evaporation rate of the alcohol-mixed fuel is almost the same as that of the fuel without alcohol, and in addition, the alcohol establishes a low stoichiometric air-fuel ratio.

If the temperature of the cooling water is in a temperature region B which is higher than the temperature region A, the alcohol-mixed fuel is injected in nearly an equal amount as the fuel without alcohol to bring the air-fuel ratio to the target air-fuel ratio. This is because in the temperature region B, the evaporation rate of the alcohol-mixed fuel is relatively higher than that of the fuel without alcohol and, besides, the alcohol establishes a low stoichiometric air-fuel ratio.

Further, if the temperature of the cooling water is in a temperature region which is higher than the above temperature region B and includes the boiling point of the alcohol, i.e., a temperature region C in FIG. 3, the fuel without alcohol is injected in an amount smaller than the amount of the alcohol-mixed fuel to bring the air-fuel ratio to the target air-fuel ratio. This is because in the temperature region C, the evaporation rate of the alcohol-mixed fuel is higher than that of the fuel without alcohol, and in addition, the alcohol establishes a low stoichiometric air-fuel ratio.

Figure 4A:
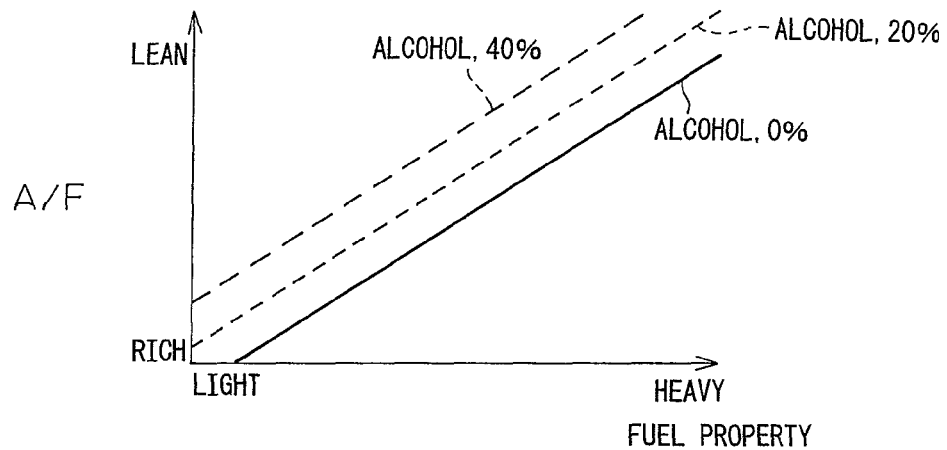
FIGS. 4A to 4C are diagrams illustrating relationships between the fuel property and the air-fuel ratio of the exhaust gas in various temperature regions.
Figure 4B:
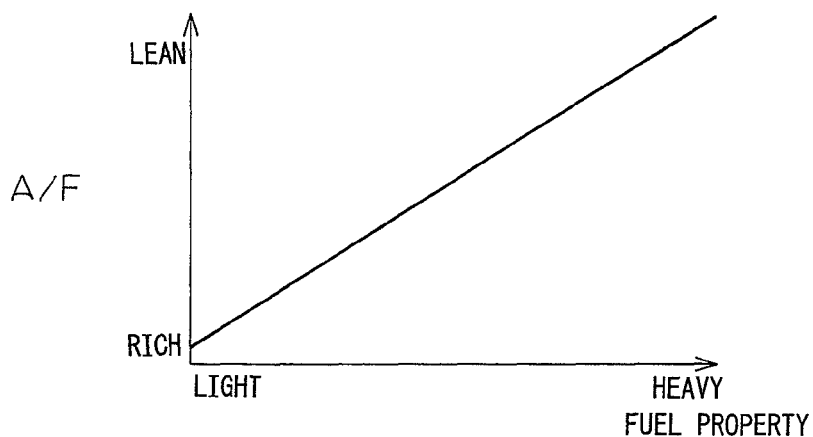
Figure 4C:
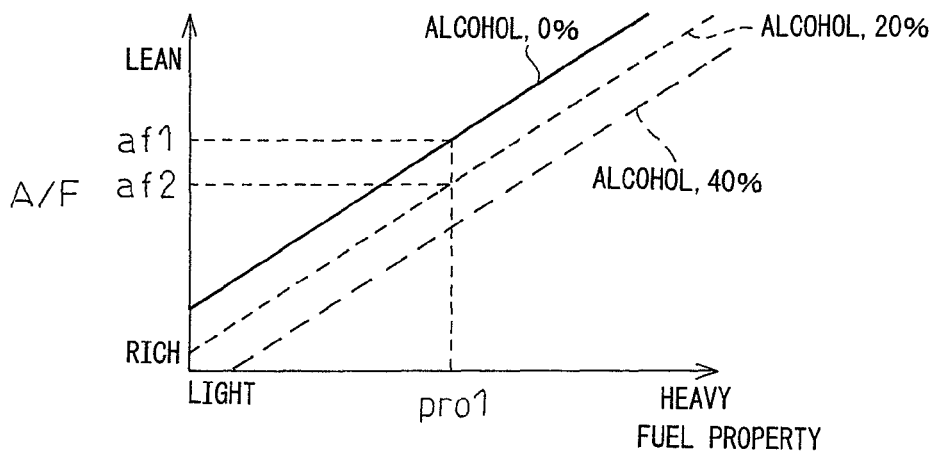

Thus, the relationship between the air-fuel ratios of the exhaust gas when the alcohol-mixed fuel is used and when the fuel without alcohol is used differs depending upon the temperature regions of the cooling water. FIGS. 4A to 4C are diagrams illustrating the relationship between the fuel property and the air-fuel ratio of the exhaust gas in the temperature regions A, B and C, when the fuel is injected in the same amount.

When the fuel is injected in the same amount, as shown in FIGS. 4A to 4C, the air-fuel ratio of the exhaust gas becomes lean as the ratio of the heavy fuel increases between the heavy fuel and the light fuel irrespective of the temperature region of the cooling water. If the temperature of the cooling water is in the temperature region A, as shown in FIG. 4A, the air-fuel ratio of the exhaust gas becomes lean as the alcohol ratio increases in the fuel. If the heavy fuel/light fuel ratio of the fuel has been known in the temperature region A, the alcohol ratio in the fuel can be estimated based on the air-fuel ratio of the exhaust gas.

If the temperature of the cooling water is in the temperature region B as shown in FIG. 4B, the air-fuel ratio of the exhaust gas does not vary despite a change in the alcohol ratio in the fuel. In the temperature region B, it is therefore possible to estimate the heavy fuel/light fuel ratio in the fuel based on the air-fuel ratio of the exhaust gas irrespective of if the alcohol is contained or not.

If the temperature of the cooling water is in the temperature region C as shown in FIG. 4C, the air-fuel ratio of the exhaust gas becomes rich as the alcohol ratio increases in the fuel. If the heavy fuel/light fuel ratio of the fuel has been known in the temperature region C, the alcohol ratio in the fuel can be estimated based on the air-fuel ratio of the exhaust gas.

In this embodiment, therefore, if the temperature of the cooling water is in the temperature region B at the start of the engine, the air-fuel ratio of the exhaust gas is detected by the air-fuel ratio detector 41, and the heavy fuel/light fuel ratio is estimated based on the air-fuel ratio of the exhaust gas that is detected. If the estimated heavy fuel/light fuel ratio is nearly the same as the heavy fuel/light fuel ratio detected by the heavy fuel/light fuel ratio detector 39, it is so decided that the heavy fuel/light fuel ratio detector 39 is not in abnormal condition. However, if the estimated heavy fuel/light fuel ratio is greatly different from the heavy fuel/light fuel ratio detected by the heavy fuel/light fuel ratio detector 39, it is determined that the heavy fuel/light fuel ratio detector 39 is in abnormal condition. Therefore, even when the alcohol-mixed fuel is used, it is allowed to properly diagnose if the heavy fuel/light fuel ratio detector 39 is in abnormal condition.

In the case where the temperature of the cooling water is in the temperature region B, if the heavy fuel/light fuel ratio estimated based on the air-fuel ratio of the exhaust gas is greatly different from the heavy fuel/light fuel ratio detected by the heavy fuel/light fuel ratio detector 39, it is possible to estimate an error of the heavy fuel/light fuel ratio detector 39 from the difference in the heavy fuel/light fuel ratio. If it is determined that the heavy fuel/light fuel ratio detector 39 is in abnormal condition, then the heavy fuel/light fuel ratio detected by the heavy fuel/light fuel ratio detector 39 may be corrected based upon a difference between the estimated heavy fuel/light fuel ratio and the detected heavy fuel/light fuel ratio. By utilizing the heavy fuel/light fuel ratio detected by the heavy fuel/light fuel ratio detector 39 after correcting it, it is therefore, possible to estimate the ideal heavy fuel/light fuel ratio.

According to this embodiment, after having diagnosed if the heavy fuel/light fuel ratio detector 39 is in abnormal condition, the air-fuel ratio of the exhaust gas is detected by the air-fuel ratio detector 41 while the temperature of the cooling water is in the temperature region C, and the alcohol ratio is estimated based on the air-fuel ratio of the exhaust gas that is detected by the air-fuel ratio detector 41.

The heavy fuel/light fuel ratio detector 39 has been already diagnosed if it is in abnormal condition. Namely, if the heavy fuel/light fuel ratio detector 39 has not been decided to be in abnormal condition, then the heavy fuel/light fuel ratio detected by the heavy fuel/light fuel ratio detector 39 represents the ideal heavy fuel/light fuel ratio. Therefore, if the temperature of the cooling water is in the temperature region C, the alcohol ratio detector 40 is diagnosed if it is in abnormal condition, based upon the heavy fuel/light fuel ratio detected by the heavy fuel/light fuel ratio detector 39 and upon the air-fuel ratio of the exhaust gas detected by the air-fuel ratio detector 41.

If the heavy fuel/light fuel ratio detected by the heavy fuel/light fuel ratio detector 39 is pro1 as shown in FIG. 4C in the case when the alcohol ratio is, for example, 0%, then the air-fuel ratio of the exhaust gas detected by the air-fuel ratio detector 41 becomes af1. However, at this time, if the air-fuel ratio of the exhaust gas detected by the air-fuel ratio detector 41 is not af1 but is, for example, af2, then the alcohol ratio detector 40 is not correctly indicating the ideal value. Therefore, in this case, the alcohol ratio detector in this embodiment is decided to be in abnormal condition. As a result, even when the heavy fuel, light fuel and alcohol-mixed fuel are used, it is made possible to properly diagnose if the alcohol ratio detector is in abnormal condition.

In the case where the temperature of the cooling water is in the temperature region C, if the alcohol ratio estimated based on the air-fuel ratio of the exhaust gas is greatly different from the alcohol ratio detected by the alcohol ratio detector 40, it is possible to estimate an error of the alcohol ratio detector 40 from the difference in the alcohol ratio. If it is decided that the alcohol ratio detector 40 is in abnormal condition, then the alcohol ratio detected by the alcohol ratio detector 40 may be corrected based upon a difference between the estimated alcohol ratio and the detected alcohol ratio. Therefore, by utilizing the alcohol ratio detected by the alcohol ratio detector 40 after correcting it, it is possible to estimate the ideal alcohol ratio.

FIGS. 5 and 6 illustrate a flowchart of a control routine for diagnosing the heavy fuel/light fuel ratio detector 39 and the alcohol ratio detector 40 if they are in abnormal condition. The control routine that is shown in FIGS. 5 and 6 is executed at regular time intervals.

Referring to FIGS. 5 and 6, first, the temperature of the cooling water, heavy fuel/light fuel ratio and alcohol ratio are detected by the water temperature detector (not shown) that detects the temperature of the engine cooling water, heavy fuel/light fuel ratio detector 39 and alcohol ratio detector 40, respectively, at steps S11 to S13. Next, at step S14, it is judged if the fuel cap 21 is opened, i.e., if the fuel tank 20 is refueled prior to starting the engine. Alternatively, the refueling may be judged by a fuel gauge 43 relying upon if the amount of fuel has increased in the fuel tank 20 between when the engine is halted last time and when the engine is started this time.

If it is judged at step S14 that the fuel cap is opened, i.e., the fuel tank 20 is refueled, the routine proceeds to step S15 where an abnormal condition diagnosing flag Xdet is set to 1.

The routine, thereafter, proceeds to step S16. The abnormal condition diagnosing flag Xdet is set to 1 when the abnormal condition diagnosing control is being executed, and is set to 0 when the abnormal condition diagnosing control ends. If it is judged at step S14 that the fuel tank 20 has not been refueled, the routine proceeds to step S17 where it is judged if the abnormal condition diagnosing flag Xdet is 1, i.e., if the abnormal condition diagnosing control is being executed. If it is judged that the abnormal condition diagnosing control is being executed (Xdet=1), the routine proceeds to step S16. On the other hand, if it is judged at step S17 that the abnormal condition diagnosing control has finished (Xdet=0), the control routine ends.

Next, at steps S16 and S18, it is judged if the cooling water temperature thw detected by the water temperature detector is lying between thw1 and thw2 or between thw2 and thw3, i.e., if the cooling water temperature is in the temperature region B or in the temperature region C. If it is judged at steps S16 and S18 that the cooling water temperature is neither in the temperature region B nor in the temperature region C, the control routine ends. If it is judged at steps S16 and S18 that the cooling water temperature is in the temperature region B, the routine proceeds to step S19 where a heavy fuel/light fuel diagnosing flag Xgas is set to 1. The heavy fuel/light fuel diagnosing flag Xgas is set to 1 when the diagnosis of the heavy fuel/light fuel ratio detector 39 is executed, and is set to 0 when the diagnosis of the two detectors 39 and 40 has finished.

Next, at step S20, it is judged if the air-fuel ratio of the exhaust gas is the target air-fuel ratio. If it is judged that the air-fuel ratio of the exhaust gas is not the target air-fuel ratio, the routine proceeds to steps S21 and S22 where it is so judged that the heavy fuel/light fuel ratio detector 39 is in abnormal condition, and a correction coefficient is calculated for the heavy fuel/light fuel ratio detected by the heavy fuel/light fuel ratio detector 39 based upon a difference between the air-fuel ratio of the exhaust gas and the target air-fuel ratio.

On the other hand, if it is judged at steps S16 and S18 that the cooling water temperature is in the temperature region C, the routine proceeds to step S23 where an alcohol diagnosing flag Xal is set to 1. The alcohol diagnosing flag Xal is set to 1 when the diagnosis of the alcohol ratio detector 40 is executed, and is set to 0 when the diagnosis of the two detectors 39 and 40 has finished.

Next, at step S24, it is judged if the air-fuel ratio of the exhaust gas is the target air-fuel ratio. If it is judged that the air-fuel ratio of the exhaust gas is not the target air-fuel ratio, the routine proceeds to steps S25 and S26 where it is judged that the alcohol ratio detector 40 is in abnormal condition, and a correction coefficient is calculated for the alcohol ratio detected by the alcohol ratio detector 40, based upon a difference between the air-fuel ratio of the exhaust gas and the target air-fuel ratio.

Next, at step S27, it is judged if the heavy fuel/light fuel diagnosing flag Xgas and the alcohol diagnosing flag Xal are both 1. If it is judged that at least one of them are not 1, i.e., the diagnosis of the heavy fuel/light fuel ratio detector 39 or of the alcohol ratio detector 40 has not been finished, then the control routine ends. On the other hand, if it is judged that both flags are 1, i.e., if the diagnosis of the two detectors 39 and 40 has been finished, the routine proceeds to step S28. At step S28, the abnormal condition diagnosing flag Xdat is set to 0, and the heavy fuel/light fuel diagnosing flag Xgas and the alcohol diagnosing flag Xal are set to 0, and then the control routine ends.

Next, described below is a second embodiment of the present invention. In the above embodiment, the fuel property detectors 39 and 40 were diagnosed if they were in abnormal condition relying upon the air-fuel ratio of the exhaust gas detected by the air-fuel ratio detector 41. In this embodiment, however, the fuel property detectors 39 and 40 are diagnosed if they are in abnormal condition based on the ignition timing of the spark plug 3.

In the internal combustion engine of this embodiment, the ignition timing is advanced or retarded so that the engine rotational speed reaches a target rotational speed at the start of the engine. That is, the ignition timing is advanced when the engine rotational speed is lower than the target rotational speed or when the increasing rate of the engine rotational speed is slow. The ignition timing, on the other hand, is retarded when the engine rotational speed is higher than the target rotational speed or when the increasing rate of the engine rotational seed is high.

The evaporation rate of the alcohol-mixed fuel differs from that of the fuel without alcohol, depending upon the temperature of the cooling water, as described above with reference to FIG. 3. Therefore, the ignition timing to bring the engine rotational speed to the target rotational speed varies depending upon the temperature of the cooling water. In this case, the relationship between the ignition timing for bringing the engine rotational speed to the target rotational speed and the temperature of the cooling water is similar to that shown in FIG. 3.

Figure 7A:
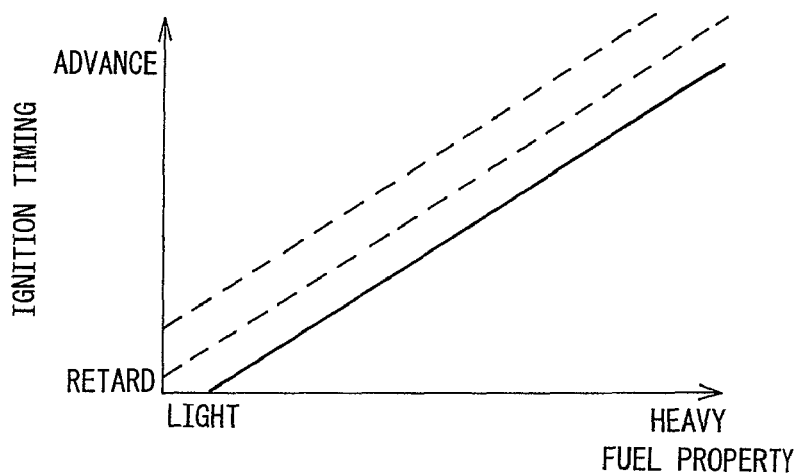
FIGS. 7A to 7C are diagrams illustrating relationships between the fuel property and the ignition timing in various temperature regions.
Figure 7B:
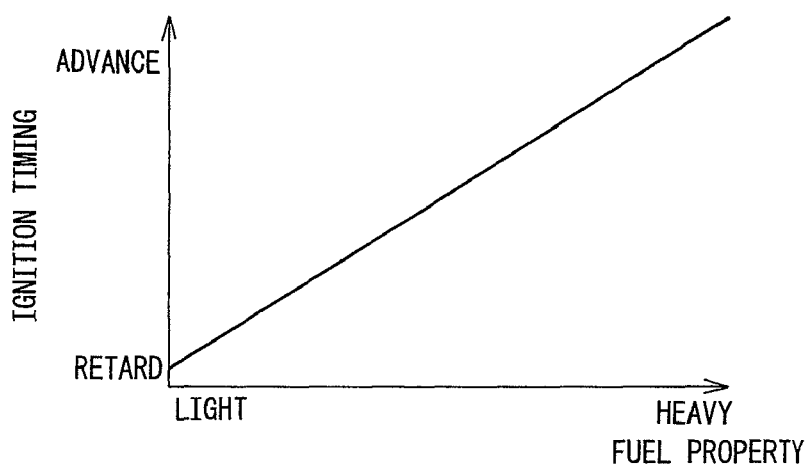
Figure 7C:
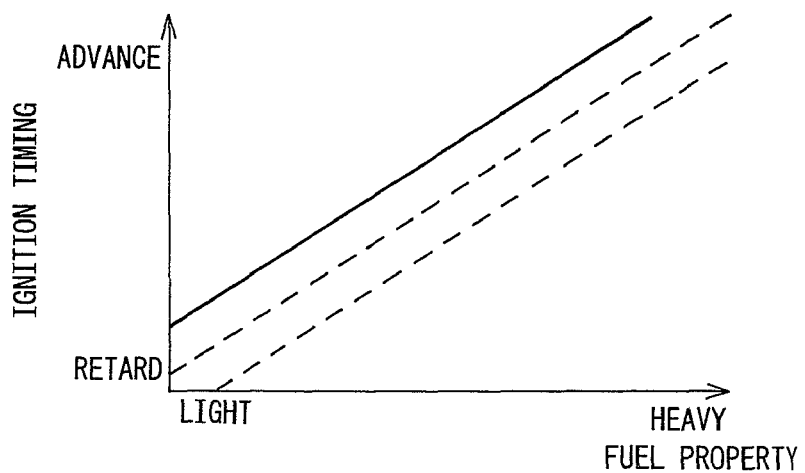

FIGS. 7A, 7B and 7C are diagrams illustrating relationships between the fuel property and the ignition timing in the temperature regions A, B and C, when the engine rotational speed is maintained the same. As shown in FIGS. 7A to 7C, if the engine rotational speed remains the same, the ignition timing is advanced as the ratio of the heavy fuel increases between the heavy fuel and the light fuel, irrespective of the temperature region of the cooling water. This is because as the ratio of the heavy fuel increases, the evaporation rate of the fuel decreases and thus the amount of fuel that contributes to the combustion decreases.

If the temperature of the cooling water is in the temperature region A, the ignition timing is advanced as the alcohol ratio in the fuel increases, as shown in FIG. 7A. Therefore, in the temperature region A, if the heavy fuel/light fuel ratio in the fuel has been known, the alcohol ratio in the fuel can be estimated based on the ignition timing.

If the temperature of the cooling water is in the temperature region B, the ignition timing does not vary even if the alcohol ratio in the fuel is changed, as shown in FIG. 7B. Therefore, in the temperature region B, the heavy fuel/light fuel ratio can be estimated based on the ignition timing, irrespective of if the alcohol is contained.

If the temperature of the cooling water is in the temperature region C, the ignition timing is retarded as the alcohol ratio in the fuel increases, as shown in FIG. 7C. If the heavy fuel/light fuel ratio in the fuel has been known in the temperature region C, therefore, the alcohol ratio in the fuel can be estimated based on the ignition timing.

According to the second embodiment, therefore, the ignition timing of the spark plug 3 is obtained when the temperature of the cooling water is in the temperature region B at the start of the engine, and the heavy fuel/light fuel ratio is estimated based on the ignition timing that is obtained. If the estimated heavy fuel/light fuel ratio is nearly the same as the heavy fuel/light fuel ratio detected by the heavy fuel/light fuel ratio detector 39, it is so judged that the heavy fuel/light fuel ratio detector 39 is not in abnormal condition. If the estimated heavy fuel/light fuel ratio is greatly different from the detected heavy fuel/light fuel ratio, it is judged that the heavy fuel/light fuel ratio detector 39 is in abnormal condition. Thus, it is possible to properly diagnose the heavy fuel/light fuel ratio detector 39 if it is in abnormal condition even when the alcohol-mixed fuel is used.

If the heavy fuel/light fuel ratio estimated based on the ignition timing is greatly different from the heavy fuel/light fuel ratio detected by the heavy fuel/light fuel ratio detector 39 while the temperature of the cooling water is in the temperature region B, then the error of the heavy fuel/light fuel ratio detector 39 can be estimated from the difference in the heavy fuel/light fuel ratio like in the first embodiment.

According to the second embodiment, after the heavy fuel/light fuel ratio detector 39 is diagnosed, the ignition timing of the spark plug 3 is obtained while the temperature of the cooling water is in the temperature region C, and the alcohol ratio is estimated based on the ignition timing that is obtained.

The heavy fuel/light fuel ratio detector 39 has been already diagnosed. Therefore, if the heavy fuel/light fuel ratio detector 39 has not been judged to be in abnormal condition, then the heavy fuel/light fuel ratio detected by the heavy fuel/light fuel ratio detector 39 represents the ideal heavy fuel/light fuel ratio. Therefore, if the temperature of the cooling water is in the temperature region C, the alcohol ratio detector 40 is diagnosed if it is in abnormal condition, based on the heavy fuel/light fuel ratio detected by the heavy fuel/light fuel ratio detector 39 and on the ignition timing obtained from the spark plug 3.

If the alcohol ratio estimated based on the ignition timing is greatly different from the alcohol ratio detected by the alcohol ratio detector 40 while the temperature of the cooling water is in the temperature region C, then the error of the alcohol ratio detector 40 can be estimated from the difference in the alcohol ratio like in the first embodiment.

In the above embodiments of the invention, the heavy fuel/light fuel ratio detector 39 and the alcohol ratio detector 40 are diagnosed if they are in abnormal condition based on the air-fuel ratio of the exhaust gas or the ignition timing. However, the heavy fuel/light fuel ratio and the alcohol ratio may be estimated based on the air-fuel ratio of the exhaust gas and the ignition timing, without providing the above detectors.

Though particular embodiments of the present invention were described above in detail, person skilled in the art will be able to further change and modify the invention in various ways without departing from the spirit and scope of the invention.

DESCRIPTION OF REFERENCE NUMERALS

1—engine body
16—fuel injectors
17—delivery pipe
18—fuel pipe
19—fuel pump
20—fuel tank
21—fuel cap
30—ECU
39—heavy fuel/light fuel ratio detector
40—alcohol ratio detector
41—air-fuel ratio detector
43—fuel gauge
44—open/close detector

The invention claimed is:

1. A device for controlling an internal combustion engine which uses, as the fuel, a heavy fuel, a light fuel, an alcohol fuel and a mixture thereof, comprising a heavy fuel/light fuel ratio detector capable of detecting the ratio of the heavy fuel and the light fuel, and an air-fuel ratio detector for detecting the air-fuel ratio of the exhaust gas, wherein the amount of fuel injection is calculated based on the heavy fuel/light fuel ratio detector so that the air-fuel ratio becomes a target air-fuel ratio, and wherein the heavy fuel/light fuel ratio detector is diagnosed if it is in abnormal condition based on a difference between the target air-fuel ratio and the air-fuel ratio detected by the air-fuel ratio detector while the engine temperature is in a particular temperature region.

2. The device for controlling an internal combustion engine according to claim 1, further comprising an alcohol ratio detector capable of detecting the alcohol ratio in the fuel, wherein the control device calculate the amount of fuel injection based on the heavy fuel/light fuel ratio detector as well as on the alcohol ratio detector, so that the air-fuel ratio becomes the target air-fuel ratio, and wherein the alcohol ratio detector is diagnosed if it is in abnormal condition, based on a difference between the target air-fuel ratio and the air-fuel ratio detected by the air-fuel ratio detector while the engine temperature is outside the particular temperature region.

3. The device for controlling an internal combustion engine according to claim 1, wherein when the air-fuel ratio detected by the air-fuel ratio detector is leaner than the target air-fuel ratio while the engine temperature is in the particular temperature region, the ideal ratio of the heavy fuel to the light fuel is judged to be higher than the ratio of the heavy fuel to the light fuel detected by the heavy fuel/light fuel ratio detector, and when the air-fuel ratio detected by the air-fuel ratio detector is richer than the target air-fuel ratio while the engine temperature is in the particular temperature region, the ideal ratio of the light fuel to the heavy fuel is judged to be higher than the ratio of the light fuel to the heavy fuel detected by the heavy fuel/light fuel ratio detector.

4. The device for controlling an internal combustion engine according to claim 1, wherein the calculated amount of fuel injection is corrected based upon a difference between the target air-fuel ratio and the air-fuel ratio detected by the air-fuel ratio detector while the engine temperature is in the particular temperature region, and upon a difference between the target air-fuel ratio and the air-fuel ratio detected by the air-fuel ratio detector while the engine temperature is outside the particular temperature region.

5. The device for controlling an internal combustion engine according to claim 1, further comprising a refuel judging device for determining if the fuel is supplied, and it is judged if the heavy fuel/light fuel ratio detector is in abnormal condition only when the refuel judging device has judged that the fuel is supplied.

6. A device for controlling an internal combustion engine which uses, as the fuel, a heavy fuel, a light fuel, an alcohol fuel and a mixture thereof, comprising a heavy fuel/light fuel ratio detector capable of detecting the ratio of the heavy fuel and the light fuel, wherein the ignition timing is controlled so that the engine rotational speed reaches a target rotational speed, and wherein an estimated ignition timing at which the ignition timing is estimated to arrive is calculated based on the heavy fuel/light fuel ratio detector, and the heavy fuel/light fuel ratio detector is diagnosed if it is in abnormal condition, based on a difference between the estimated ignition timing and the ideal ignition timing while the engine temperature is in a particular temperature region.

7. The device for controlling an internal combustion engine according to claim 6, wherein further comprising an alcohol ratio detector capable of detecting the alcohol ratio in the fuel, wherein the control device calculate the estimated ignition timing at which the ignition timing is estimated to arrive based on the heavy fuel/light fuel ratio detector as well as on the alcohol ratio detector, and wherein the alcohol ratio detector is diagnosed if it is in abnormal condition, based on a difference between the estimated ignition timing and the ideal ignition timing while the engine temperature is outside the particular temperature region.

8. The device for controlling an internal combustion engine according to claim 6, wherein when the ideal ignition timing is on the advanced side of the estimated ignition timing while the engine temperature is in the particular temperature region, the ideal ratio of the heavy fuel to the light fuel is judged to be higher than the ratio of the heavy fuel to the light fuel detected by the heavy fuel/light fuel ratio detector and when the ideal ignition timing is on the retarded side of the estimated ignition timing while the engine temperature is in the particular temperature region, the ideal ratio of the light fuel to the heavy fuel is judged to be higher than the ratio of the light fuel to the heavy fuel detected by the heavy fuel/light fuel ratio detector.

* * * * *